United States Patent
Wissing et al.

(10) Patent No.: US 8,724,482 B2
(45) Date of Patent: *May 13, 2014

(54) POTS EXTENDER FOR VOICE FALLBACK IN A SUBSCRIBER LINE

(75) Inventors: Jeffrey Wissing, Kanata (CA); Cecil Mathews, Rohnert Park (CA); Jiri Pek, Ottawa (CA); Drasko Milasin, Kanata (CA)

(73) Assignee: Wi-Lan, Inc., Ottawa, Ontario ( * ) Notice: Subject to any disclaimer, the term of this patent is extended or adjusted under 35 U.S.C. 154(b) by 0 days.

This patent is subject to a terminal disclaimer.

(21) Appl. No.: 13/561,693

(22) Filed: Jul. 30, 2012

(65) Prior Publication Data
US 2012/0287925 A1 Nov. 15, 2012

Related U.S. Application Data (60) Continuation of application No. 11/828,799, filed on Jul. 26, 2007, now Pat. No. 8,233,472, which is a division of application No. 09/820,029, filed on Mar. 28, 2001, now Pat. No. 7,254,110.

(51) Int. Cl.
*H04L 12/28* (2006.01)
*H04J 1/16* (2006.01)

(52) U.S. Cl.
USPC ............ 370/248; 370/252; 370/218; 375/222

(58) Field of Classification Search
CPC ......................... H04L 12/6418; H04Q 11/0478
USPC ............................ 370/252, 248, 218; 375/222
See application file for complete search history.

(56) References Cited

U.S. PATENT DOCUMENTS

| | | | |
|---|---|---|---|
| 5,216,704 A | 6/1993 | Williams | |
| 5,883,941 A | 3/1999 | Akers | |
| 6,151,335 A | 11/2000 | Ko et al. | |
| 6,167,095 A * | 12/2000 | Furukawa et al. | 375/285 |
| 6,272,209 B1 * | 8/2001 | Bridger et al. | 379/27.01 |
| 6,282,660 B1 | 8/2001 | Anne et al. | |
| 6,400,803 B1 * | 6/2002 | Tate et al. | 379/27.06 |
| 6,519,250 B1 | 2/2003 | Fan | |
| 6,520,744 B1 | 2/2003 | Verbin et al. | |
| 6,546,089 B1 | 4/2003 | Chea et al. | |
| 6,639,913 B1 | 10/2003 | Frankel et al. | |
| 6,640,239 B1 * | 10/2003 | Gidwani | 709/203 |
| 6,647,117 B1 * | 11/2003 | Wallace et al. | 379/413 |
| 7,010,026 B1 * | 3/2006 | Hjartarson et al. | 375/220 |

(Continued)

FOREIGN PATENT DOCUMENTS

| | | |
|---|---|---|
| GB | 2 313 979 | 12/1997 |
| WO | 01/13593 | 2/2001 |
| WO | 01/13618 | 2/2001 |

*Primary Examiner* — John Pezzlo
(74) *Attorney, Agent, or Firm* — Volpe and Koenig, P.C.

(57) ABSTRACT

A full services access multiplexer is described. A master DSL modem is coupled to a conductor pair. A POTS extender is coupled to the conductor pair and may sense the operation of a fallback or other signal on the conductor pair. A suppression signal may be transmitted to the master DSL modem upon occurrence of the fallback. The suppression signal may travel over a control circuit. Traffic over a backplane or other network segment may be uninterrupted to an Integrated Access Device by handling signals inbound and outbound to the backplane via packet assembler and disassembler (PAD). The PAD may transmit a data stream to vocoder and received a data stream from vocoder for injection onto the backplane.

8 Claims, 4 Drawing Sheets

(56) References Cited

U.S. PATENT DOCUMENTS

| | | |
|---|---|---|
| 7,106,759 B1 * | 9/2006 | Feldpausch .................. 370/516 |
| 7,385,963 B1 | 6/2008 | Carew et al. |
| 2001/0004382 A1 | 6/2001 | Van Wonterghem |
| 2002/0044199 A1 * | 4/2002 | Barzebar et al. ........... 348/14.01 |
| 2002/0044525 A1 * | 4/2002 | Czerwiec et al. ............. 370/216 |
| 2002/0191546 A1 * | 12/2002 | Chong .......................... 370/252 |
| 2003/0190016 A1 * | 10/2003 | MacDonald et al. ...... 379/22.04 |
| 2006/0159116 A1 * | 7/2006 | Gerszberg et al. ............ 370/431 |
| 2007/0110043 A1 | 5/2007 | Girard |
| 2008/0019355 A1 | 1/2008 | Wissing et al. |

* cited by examiner

POTS EXTENDER FOR VOICE FALLBACK IN A SUBSCRIBER LINE

CROSS REFERENCE TO RELATED APPLICATIONS

This application is a continuation of U.S. patent application Ser. No. 11/828,799, filed Jul. 26, 2007, which is a division of U.S. patent application Ser. No. 09/820,029, filed Mar. 28, 2001, which issued as U.S. Pat. No. 7,254,110 on Aug. 7, 2007, the contents of which are hereby incorporated by reference herein.

TECHNICAL FIELD

The present disclosure relates to broadband access methods and more particularly to providing a network-side surrogate when an access device is impacted by a fault.

BACKGROUND

Current voice telephone system operators are generally engaging in a growth phase of deploying data services to their subscribers. One of the chief ways to do this is to offer digital subscriber lines (DSL) wherein both voice and data may be carried over a common twisted pair cable to a subscriber's residence or business. In one of the more popular versions of DSL, Asymmetric Digital Subscriber Line (ADSL), a twisted pair carries two types of duplexed signals over different frequency bands. The first signal is the voice signal, generally at 4 KHz and below. The second signal is the data signal, generally modulated at above 4 KHz.

Other forms of DSL may inter-mingle voice signals with data, by, e.g. voice over packet (VOP). Such forms include: Symmetric DSL (SDSL), High bit-rate DSL (HDSL), and Very-high-bit-rate DSL (VDSL). In such cases, the voice signal may be modified by a Integrated Access Device (IAD) to be converted into data packets. A IAD is intended to provide access to the twisted pair by multiplexing at least one voice signal with other signals, such as data, which is used most commonly by computers for internet access. Such a device, coupled with DSL service can provide a great improvement to home-owners or small businesses because the cost to maintain a single twisted pair subscriber line that multiplexes various signals is much less than having a dedicated subscriber line for each device at the customer premises.

Unfortunately, because the IAD is performing high level communications functions—essentially changing the signaling format between dissimilar networks—the IAD may be susceptible to power failures that leave none of the customer premises equipment operating. Although the data culture associated with computers has long accepted, in many situations, the possibility of intermittent failures, the opposite is true for the voice telephony world. Namely, in many parts of the world, a telephone is viewed as a necessity, and particularly, a valuable tool to avert disasters through timely call placement to emergency personnel, e.g. calling 911. For this reason, telephone switches are required to have an up time greater than 99.999% of the time.

Thus the dilemma: how to offer fast data throughput, including that supporting voice, and maintain constant fault-free voice operation to a customer while keeping the number of subscriber lines between customer premises and data aggregator to a minimum.

Part of the solution lies in the ability to adjust the operation of a remote device, by transmitting a minimalist signal from the local device that is failing—a last gasp, if you will. A signal may be the encoding of two or more values (sometimes voltages) that change over time on a medium. A packet may be a series of changing values or an arrangement of signals. A protocol may involve the exchange of one series of changes on a medium. A signal may occur when a voltage changes or where an established protocol requires a responsive reply, but none occurs. Under ordinary circumstances a master DSL master modem communicates with a slave DSL modem component of the IAD so that the slave DSL modem synchronizes or trains to signals provided by the master DSL. Any failure of the slave DSL modem to respond under this protocol may be taken as a signal that the slave DSL is in a fault mode.

A data aggregator may be a Digital Subscriber Line Access Multiplexer (DSLAM) having at least one master DSL modem. Constant voice access has been accomplished for some forms of DSL by providing a secondary twisted pair line between a data aggregator and an IAD. Companies such as Coppercom provide a IAD that upon detecting a power failure, would route at least one of the telephones at a customer premises to the secondary twisted pair line—thus bypassing the data network altogether. For obvious reasons, it is twice as costly to maintain the two pairs of cabling from the data aggregator such as a switch or a DSLAM to the subscriber than in the situation where a single twisted pair is used. Nevertheless, the highly fault-resistant voice central office is much more reliably available than its counterpart, the IAD. This is true because central office (CO) equipment is more capable of providing reliability because of economies of scale, particularly due to CO backup batteries and other redundant power sources. Thus, there is a need to extend plain old telephone service (POTS) to an IAD that has failed in that the IAD is unable to transmit data packets.

SUMMARY

Embodiments of the present disclosure may provide a switch-over means at a data aggregator and other network elements when an integrated access device (IAD) is unable to transmit packets. Such a switchover may be accomplished in part by a detector that identifies the presence of analog signals on the subscriber line connecting the IAD to the data aggregator. Upon detecting such analog signal carrying e.g. voice frequencies, the data aggregator, according to the embodiments, may disable any DSL modem present at the data aggregator, and couple an analog to digital converter to prepare signals arriving on the subscriber line for transmission on a data network. Other devices such as a vocoder and packet assembler and disassembler may complete the conversion of the formerly analog signals for packet transmission through the data network. This accomplishes a couple of things. Continued telephone service may be maintained to a customer premises even though an IAD has a power failure—and this without the need for a dedicated backup analog subscriber line in addition to the subscriber line that carries digital packets. Consistent with the continued telephone service is the provision, at a central point, of power to the remote customer premise equipment, thus providing economies of scale that may be available where multiple diverse customer premises may need power back-up, and the power back-up is collectively provided ad the data aggregator.

An embodiment may provide a fallback mode to a subscriber line. A POTS extender, which may convert a upstream voice signal on the subscriber line to at least one upstream packet. Similarly the embodiment may convert a downstream packet on a packet network to a downstream voice signal.

The embodiment may have a subscriber line interface circuit (SLIC) connected to the subscriber line. A codec converts signals from the SLIC to an upstream digitized voice signal output. The codec also converts signals from a vocoder to downstream voice signals. A vocoder converts voice signals to datastreams in both the upstream and downstream directions. A packet assembler and disassembler (PAD) may convert the first data stream to at least one packet. The PAD may convert at least one packet into the second data stream, wherein the PAD is coupled to the packet network. The PAD may have at least one network address. The embodiment may include an output means for transmitting a Master Digital Subscriber Line modem control signal.

Another embodiment may include a digital subscriber line (DSL) suppression circuit for suppressing DSL modem operation on a subscriber line. The embodiment may have a subscriber line interface circuit (SLIC) for sensing current drain on the subscriber line. A means for providing a suppression signal may connect to the SLIC and a master DSL modem may operate coupled to the SLIC, said master DSL modem operating in a quiescent state upon receiving the suppression signal.

In the end, at least one embodiment may place a master DSL modem in a quiescent mode whereby voice traffic may operate on the subscriber line without any modulation by a master DSL modem interfering.

DETAILED DESCRIPTION

Figure 1A:
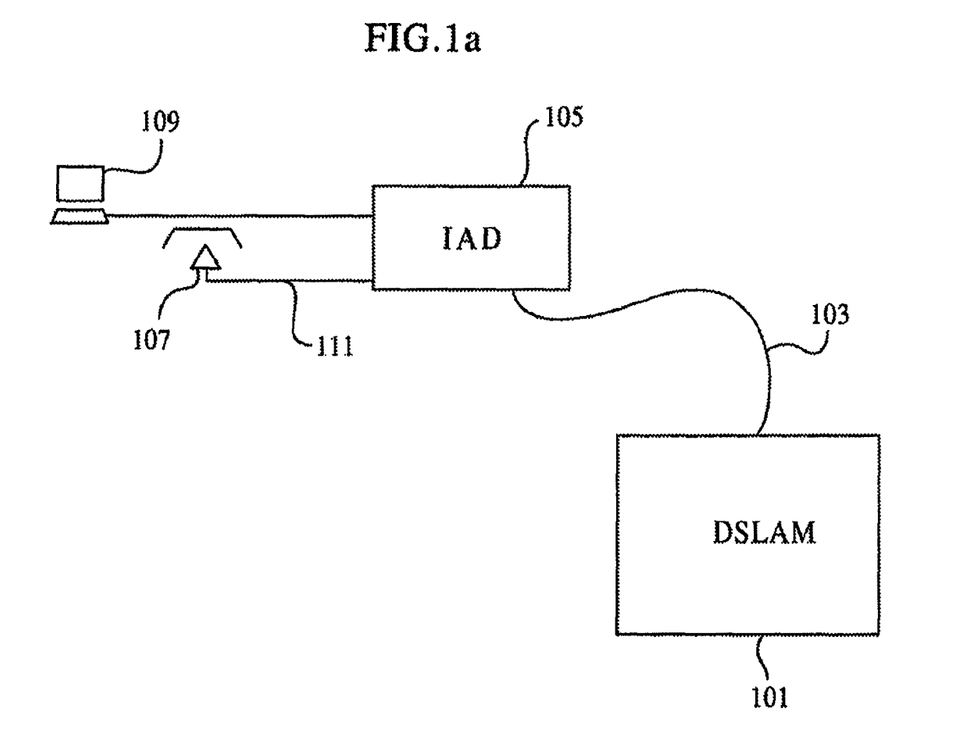
FIG. 1a shows an architecture supporting voice over packet protocol according to an embodiment.

FIG. 1a shows an architecture supporting voice over packet protocol 100 including Integrated Access Devices (IADs) and data aggregators. The data aggregator may comprise a Digital Subscriber Line Access Multiplexer (DSLAM) 101 having a Full Services Access Multiplexer (FSAM) embodiment attached to at least one local loop 103. A DSLAM is typically located at a central office and may interconnect voice packets of a subscriber line to a switch via circuit switched connection. In addition, the DSLAM may interconnect voice packets on a subscriber line to a packet network using Asynchronous Transfer Mode (ATM) and other network protocols. The FSAM terminates the local loop 103 that is served by an IAD 105. The IAD 105 may be located at the customer premises.

The IAD 105 may multiplex multiple terminals and may serve both an analog voice terminal 107 and a data terminal 109. In the case that the terminal is a voice terminal, the IAD 105 may provide, among other services, conversion of voice and other analog signals to digital encoding; packetizing such encoding into packets; and addressing such packets according to conventional packet protocols. Other functions consistent with voice over Packet (VoP) may be provided by the IAD 105, including providing signals of call progress over the analog line 111 at the customer premises, wherein the analog line is a customer premise line.

Figure 1B:
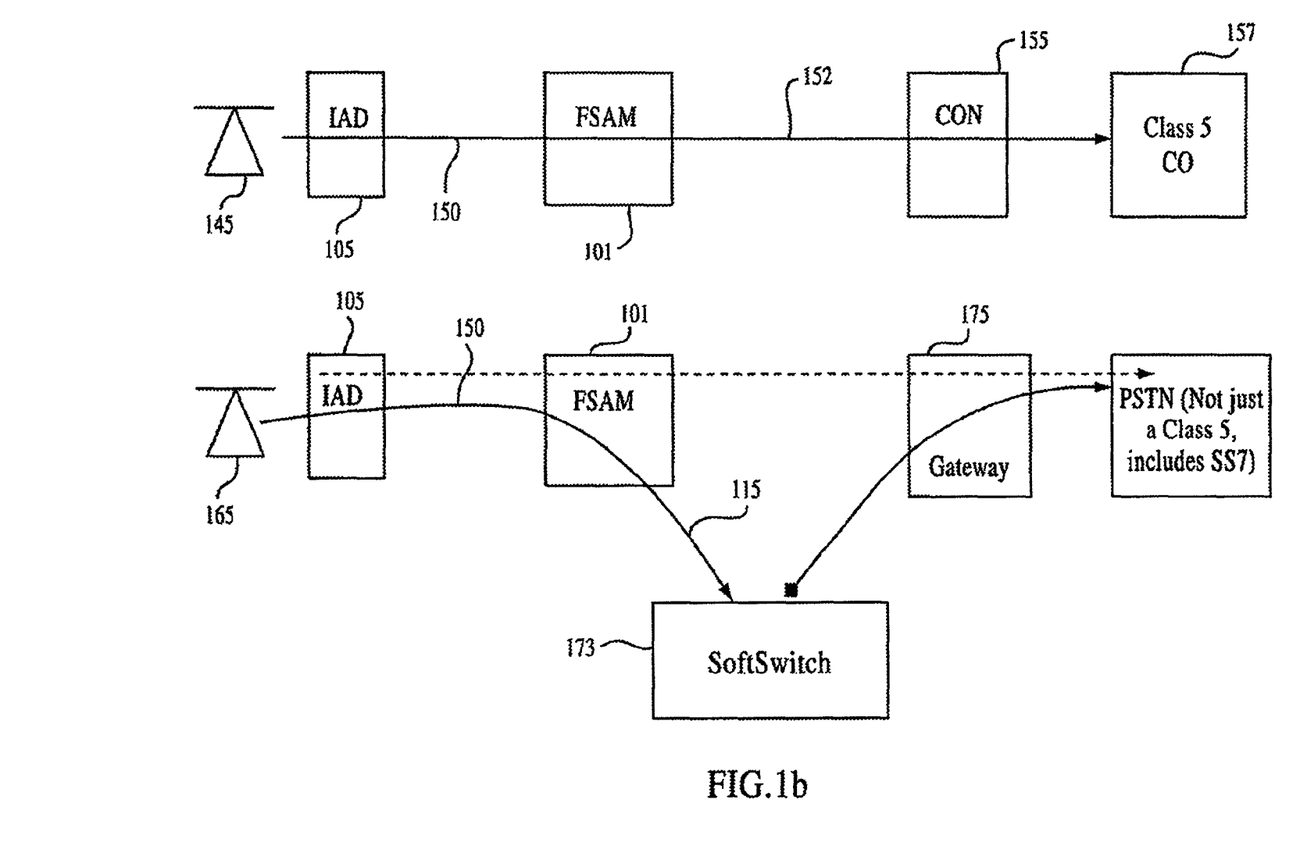
FIG. 1b shows a comparison of two architectures supporting voice over packet protocol.

FIG. 1b shows two example configurations of FIG. 1a that include a data aggregator. In the first configuration, a voice terminal 145 connects to an IAD 105, which provides access to a subscriber loop 150. A data aggregator 101 may place signals arriving by subscriber loop 150 onto a data network 152. A concentrator 155, which may be compliant to GR-303 standards, concentrates signals with traffic arriving from other sources. A switch, e.g. a class 5 central office 157, may route signals to one or more other voice terminals in a network, which includes the public switched telephone network (PSTN).

In a second configuration, a data aggregator 101 may receive such packets or analog signals over the subscriber loop 150 and route the packets or analog signals according to commands given by a softswitch 173. The softswitch 173 may direct such packets to one or more gateways 175. Such commands, or signaling, may pass over a data network 115 capable of transmitting and routing packets, e.g. the Internet.

In both configurations the data network 152 of the first configuration, and the data network 115 of the second configuration may provide a medium for receiving requests for service originating at the voice terminal 145 and 165 and controlled by the concentrator 155 or softswitch 173.

The data network 152 and 115 may operate cooperatively with the concentrator 155 or softswitch 173 and other network elements to perform call processing, billing and other functions related to transmission of voice traffic over a data network. A service provider may own or operate edge nodes of the data network 115 and secure agreements from owners or operators of neighboring nodes to assure continuing availability of packet transmission facilities. Since the operation of data networks such as the internet are known to have many levels of redundancy, traffic that reaches the network is virtually assured safe passage to a destination. Similarly, it is known that the data network may transmit a greater bandwidth with lower costs than may be accomplished in a more conventional circuit switched telephone network. The reliability and bandwidth of the internet is accomplished through the use of many redundant paths for transmission of data signals and control signals.

Even though the local loop 103 of FIG. 1a is without a redundant spare, the operation of the IAD 105 tends to be more failure prone—particularly due to transient power availability, including blackouts. The IAD may be provided with a kind of redundancy—and greatly improve the overall capability to reach the network for voice transmission purposes, even though data handling may be hampered by unavailable power.

Thus, an IAD 105 according to an embodiment of the present disclosure, may provide an IAD fallback signal in the local loop 103 to signal to the data aggregator 101 that the IAD 105 is operating in a fault mode, caused by, among other things, local power failure at the IAD 105. The IAD 105 may operate passively, wherein either it fails to respond to packets that request a response, or the IAD 105 fails to provide a follow-up signal during a time-out expiration. In any event, the absence of signals from the IAD 105, itself, is a signal that the IAD 105 is in a fault mode. The data aggregator 101 according to the embodiment, may adjust accordingly by refusing to pass along any data packets over the local loop 103 until the IAD 105 restores the packet transmission support to the local loop 103. The restoration of packet transmission support may be signaled by a IAD-restore signal dispatched by the IAD 105 onto the local loop 103. Such an IAD-restore signal may be part of the start-up handshake between a slave DSL modem 106 and a master DSL modem 126, such as synchronization signaling.

Figure 2:
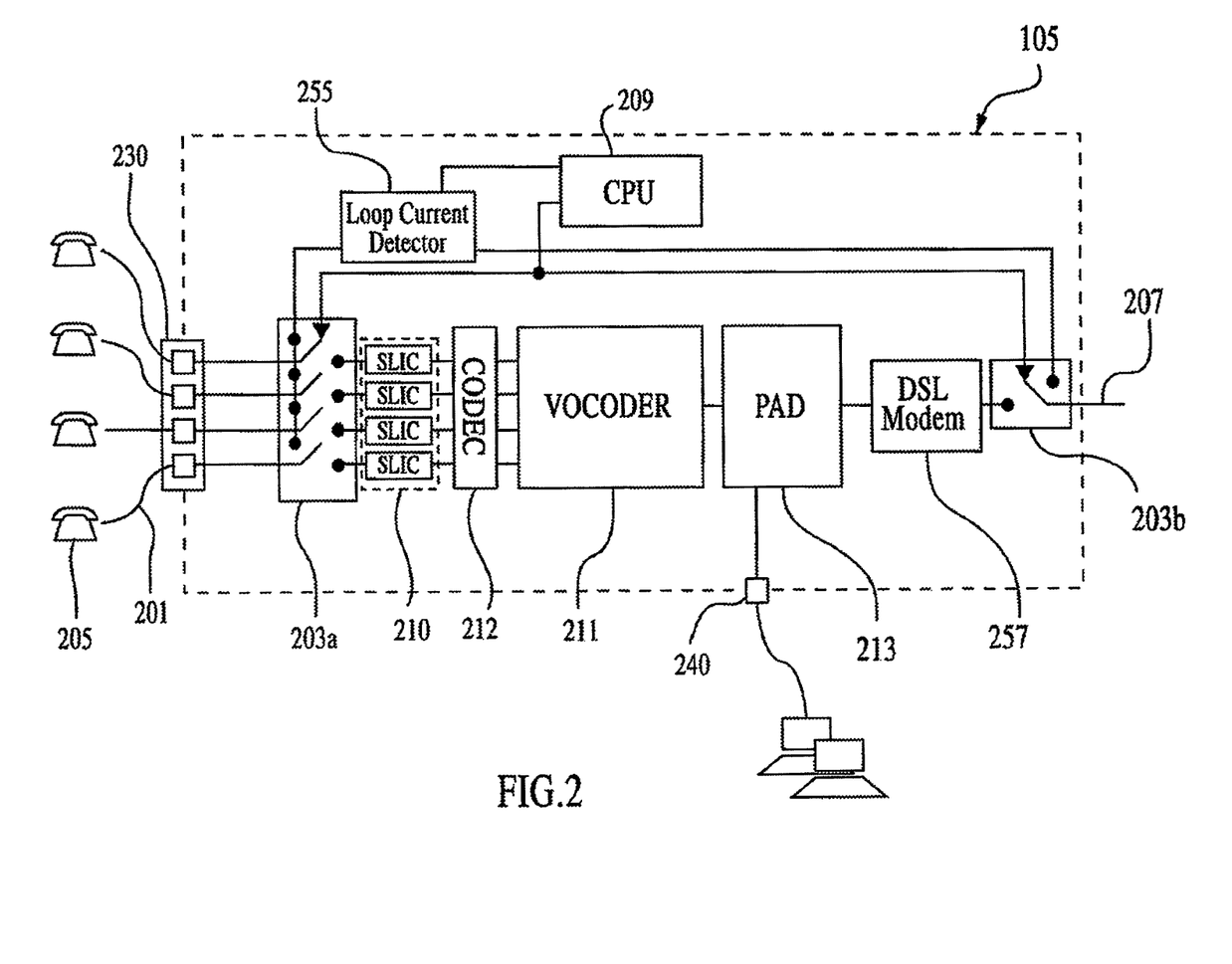
FIG. 2 shows a block diagram of a Integrated Access Device (IAD) according to an embodiment of the present disclosure.

FIG. 2 shows the internal operation of an IAD 105 according to an embodiment of the present disclosure having a switching means to bypass packet-transmitting circuits. At least one voice conductor pair 201 dedicated to a voice terminal, e.g. a conventional wired telephone, enter the IAD 105. The architecture of the embodiment may function adequately without the embodiment of FIG. 2.

In an unpowered situation, a relay 203b or other switching means provides a straight through connection between a voice terminal 205 and the data aggregator through the local loop 207. Upon applying power to the IAD 105, the central processing unit (CPU) 209 may do self testing, verify operation of IAD components, configure IP addresses and other activities of an IAD 105 necessary to route packets with correct headers and provide signaling functions. One or more of the foregoing steps occurs during a process called boot-up, or the step of booting up the processor. Upon completion of the boot-up, the CPU 209 may energize the relay 203a to switch in a vocoder 211 and a packet assembler and disassembler (PAD) 213. The vocoder 211 may receive signals from the individual voice terminals 205 by way of a bank of SLICs 210, which may provide basic power to each line 201, among other signals. The bank of SLICs 210 may provide at least one upstream signal to codec 212, wherein the codes 212 may provide an analog to digital conversion such that vocoder 211 receives digital signals. Similarly, codec 212 may convert digital signals received from the vocoder 211 to analog signals directed to the bank of SLICs 210. Vocoder 211 may be a G.711 variety of vocoder. Alternatively, the vocoder 211 may provide compression to upstream signals and decompression to downstream signals using, e.g. G.726 algorithms. The state describing the IAD 105 upon the application of power and completion of boot-up is called the vocoder mode. Failure of power restores the relay 203 to its former condition, providing a straight-through connection between the voice terminal 205 and the local loop 207. This state is called the bypass mode.

Additional telephones may be attached to the IAD 105 through ports that connect voice either directly to the local loop 207 or to the bank of SLICs 211 depending on the operating mode. For each telephone that is connected via the vocoder 211 through a distinct port, a network address may be assigned. The address assignments may be made via a local man-machine interface or by remote control, perhaps using the packet network to carry the instructions. The addresses may be IP addresses and port pair combinations or Asynchronous Transfer Mode (ATM) Virtual Circuit (VC)/Virtual Path (VP) pair identifiers. Thus the IAD 105 inherently may have the capability to present to the network (at the subscriber line) multiple virtual circuit identifiers for so long as power is supplied to properly functioning IAD 105. Storage of the address assignments may be in a local non-volatile memory to the IAD 105. Unused ports may be jumpered by a short conductor. Additional packet ports 240 may provide an interface to the PAD 213 while power is available and the relays 203 are in the vocoder mode position. Similarly, one or more data streams may be sent upstream from vocoder 211 to PAD 213 for proper packet formatting and addressing. DSL modem 257 may provide physical layer support for packets bound from PAD 213 to the upstream data aggregator on the local loop 207.

The relay 203 may switch telephony ports 230 so that while the IAD 105 is in the bypass mode, all telephony equipment including facsimile equipment, are in the same circuit, commonly referred to as a party line. The operation of the relay 203, may change the character of the local loop, by e.g. disabling the origination of data packets from the IAD 105, while in bypass mode. Similarly, the IAD 105 may lose the ability to associate a voice circuit and other addressing of the various telephony equipment. Some other device in the data network must take on that job in order for a voice call to be routed over the data network, i.e. a device upstream from the IAD 105 must adopt this function, otherwise the local telephones will be unable to make emergency calls. In other words, a FSAM embodiment of the present disclosure may provide a voice circuit association to the local loop 207, among other functions.

The detection of an off-hook condition of one or more of the telephones may be a preliminary test done by the CPU 209 following boot-up. The CPU 209 may periodically retest the line, if an off-hook condition has been detected, until all telephones connected to the IAD 105 are on-hook. Following power restoration, a boot-up and any off-hook period, the CPU 209 may energize the relay 203 to operate in a vocoder mode such that the vocoder 211 and the PAD 213 provide packet traffic to and from the local loop 207. At that time, IAD 105 may multiplex and voice traffic and data traffic from local telephones and data sources on the local loop 207.

Figure 3:
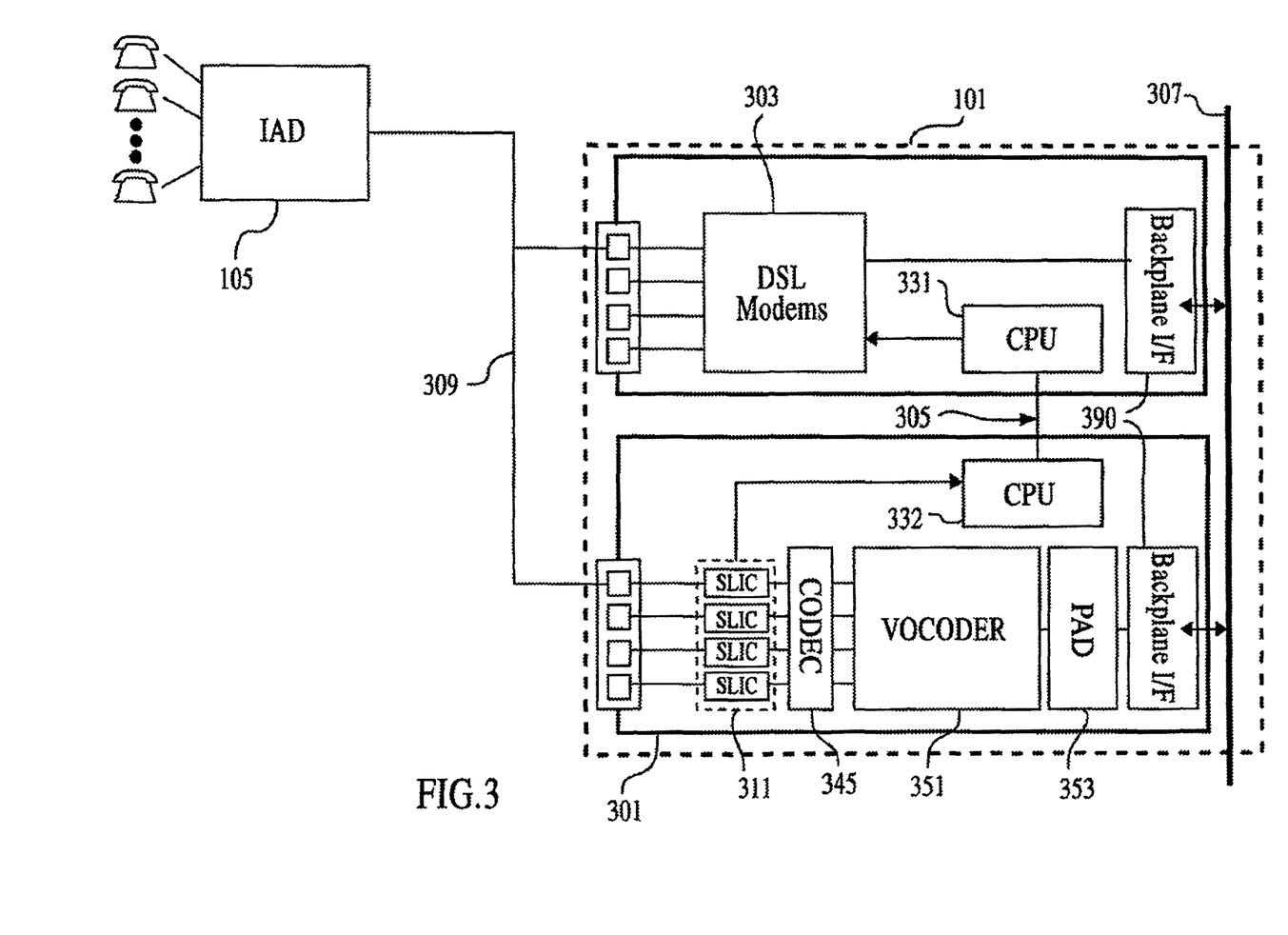
FIG. 3 shows a block diagram of a Full Services Access Multiplexer (FSAM) according to an embodiment of the present disclosure.

FIG. 3 shows a parallel configuration of a Full Service Access Multiplexer (FSAM) 315 comprised of a plain old telephone service (POTS) extender 301 and a master DSL modem 303 at the data aggregator, or FSAM. The POTS extender 301 may be a POTS extender, wherein POTS service is supported at a voice terminal through to the FSAM 315. The FSAM 315 may occupy two slots in a frame of equipment wherein one slot is filled with the POTS extender 301 and another slot is a master DSL modem 303. The frame of equipment may house other FSAMs and master DSL modems to service local loops to other subscribers. The frame of equipment may be homogeneous in the sense that all master DSL modems are slaved to at least one POTS extender. The frame of equipment may be heterogeneous in that not all local loops are terminated by a FSAM. Some local loops have no support for emergency fallback because a legacy master DSL modem terminates the local loop that is not controlled by an FSAM embodiment of the present disclosure or other life-line supporting apparatus.

Under ordinary circumstances where the master DSL modem 303 is in active communication with the IAD 105, or while the master DSL modem 303 is training the IAD 105, the master DSL modem 303 may be said to be in an active state. In this state, the master DSL modem may provide at least one voice path (VP) or other address at the backplane 307 which corresponds to at least one telephony device at the IAD 105.

The frame may provide an aggregating unit, such as a multiplexer or a router, to combine the traffic arriving at several FSAMs onto a common, high-bandwidth, trunk line. Such traffic may include upstream voice packets. Similarly, the multiplexer or router may provide downstream voice packets addressed to at least one FSAM. The frame may provide redundant trunk lines, to better assure a path to a data network, such as the Internet. In addition, load balancing, and other algorithms to distribute traffic, may be employed while sending traffic to the data network, as is known in the art.

The POTS extender 301 may have a connection to the tip of the local loop 309 in common with a master DSL modem 303. The POTS extender 301 may have a connection to the ring of the local loop 309 in common with the master DSL modem 303. The POTS extender 301 may have a control circuit 305 to the master DSL modem 303. Alternate ways to send a control signal from POTS extender 301 include transmitting such a signal through a backplane 307. Such a control circuit may be under programmed control of a CPU 331 and a CPU 332. POTS extender 301 may control the operation of the master DSL modem 303, such as, by sending a suppression signal or master DSL modem control signal to the master DSL modem 303 to suppress attempts to synchronize with an IAD 105 and enter a quiescent state. The SLIC 311 may sense a current drain in the subscriber line 309 which indicates that the IAD 105 has closed relays that put remote telephones directly on the subscriber line 309 circuit. The master DSL modem 303 may enter quiescent state by means known in the art, including removing power to the master DSL modem circuits in response to a suppression signal arriving at the master DSL modem 303.

The POTS extender 301 may have a number of circuits that permit it to support call-processing functionality. A Subscriber Line Interface Circuit (SLIC) 311 may provide loop current, electrical terminating characteristics, e.g. impedance, switch hook detection, and a ringing source as well as power the subscriber line 309 under certain conditions, such as operation in fallback mode. Switch hook detection may be provided by a switch hook detector coupled to the subscriber line 309. DTMF tones and call progress tones including dial tones may be provided by the vocoder 351 in response to signaling provided by a gateway or a concentrator. The SLIC 311 may provide a switch hook detector. In some systems, an off-hook state of the switch hook may be detected based on current drain in the twisted pair as is known in the art, thus indirectly sensing an off-hook condition of a voice terminal. The master DSL modem 303 may detect synchronization.

There is a co-ordination function between the POTS extender 301 and the master DSL 303, which may be transmitted over the control circuit 305. Ordinarily, the POTS extender 301 may operate in a passive or quiescent state, wherein the POTS extender 301 may monitor the subscriber line 309. In this state, the POTS extender 301 may not respond to packets that are addressed via the backplane 307 to an address that it may have in common with the master DSL modem 303. In other words, the POTS extender 301, while in the quiescent state, may provide no bridging function between the backplane 307 and the subscriber line 309.

An IAD fallback signal may be provided by the IAD 105 in several ways. One way is that the IAD 105 may fail to respond to synchronization signals sent by the master DSL modem 303. Another way is that the IAD 105 may fail to provide a data packet on the subscriber line within a time schedule established by a communications protocol for which it is designed to adhere. In any event, the IAD 105 begins to perform out of conformance with a protocol it has established with an upstream device, which is detectable by the POTS extender 301, which supervises or monitors the subscriber line 309. When a subscriber line or local loop 309 IAD fallback signal is detected, master DSL modem 303 synchronization and data transmit functions may be suppressed by control signals sent from the POTS extender 301 to the master DSL modem 303 over connection 305. Single circuit gateway 301 may then operate to interface the subscriber line 309 to the backplane 307, which may be multiplexed onto one or more trunk lines. Single circuit gateway 301 may operate a single voice path (VP) and a single voice circuit (VC) during operation in fallback mode. The single voice path may be associated with a lowest telephone number assigned to the at least one telephony terminals at the customer premises. Thus call setup, as may be controlled by a softswitch or a concentrator, may occur normally for calls to that voice path. Only calls from that voice path may traverse the subscriber line 309 during the fallback mode.

Referring to FIGS. 2 and 3, recovery from the fall-back may occur by sensing the subscriber line with loop current detector 255. Before power is provided to the IAD 105, the relay 203 is held in the bypass position, as shown in FIG. 2. When power is provided, CPU 209 may boot up. A program may be run on the CPU 209 wherein a test of any voice device 205 is made, wherein a determination is made if the voice device is off-hook. Off-hook voice devices will be detectable by loop current detector 255. When the CPU 209 is running and such a program detects that all voice devices 205 are on-hook, two additional steps may be performed. The relay 203 may be energized, placing each voice conductor pair 201 in electrical contact with the bank of SLICs 210, while placing the DSL modem 257 in electrical contact with the subscriber line 207. An additional step may include enabling training by the slave DSL modem 257 so that the slave DSL modem and the master DSL modem 303 may be synchronized.

When an IAD-restore signal is detected by the POTS extender 301 on the subscriber line 309, the POTS extender 301 may stop responding to any the voice path (VP) established during the IAD fallback. The POTS extender 301 may end suppression of the master DSL modem 303, by sending a master DSL modem control signal, thus permitting normal synchronization of the master DSL modem 303 with the IAD 105. The master DSL modem control signal may be one of two kinds: a signal to activate, meaning that the master DSL modem should attempt synchronization; and a signal to suppress, meaning that the master DSL modem should stop synchronization. Where multiple telephony ports of the IAD 105 are connected to telephony equipment, the IAD 105 may supply the voice paths (VP) and other addresses to each telephony port.

Thus, in fallback mode, the FSAM 315 may accomplish two things. First, provide an analog port to the customer premises equipment or IAD 105, wherein the IAD 105 may interface to the data network unimpaired by operation of any DSL modem on the circuit. Attendant with providing the analog port, the FSAM may provide a telephony current source. The current source may be used to power a remote telephone apparatus when off-hook, as is known in the art. In addition, Subscriber Line Interface Circuit (SLIC) 311 may interconnect a ringing signal source to the subscriber line 309 when an incoming call appears as received packets from the backplane 307.

A second function of the fallback mode is that the FSAM 315 may provide a VP visible on the data network corresponding to at least one telephony port of the IAD 105. A Subscriber Line Interface Circuit (SLIC) 311 may perform additional functions that enable call processing. The SLIC 311 may detect an on-hook condition by means known in the art. The SLIC 311 may detect an off-hook condition. These functions may include the provision of, ringing voltages, interconnect to battery or ring voltages, switch-hook detection and impedance matching. In addition, the FSAM 315 may convert analog traffic from the subscriber loop 309 to packets for transmission on the packet network, wherein the packets may be ATM (Asynchronous Transfer Mode) cells. The POTS extender 301 may provide a codec 345 interconnect to the subscriber line 309, wherein the codec 345 performs analog to digital conversion of signals from the SLIC 311 to provide upstream digital voice signal. Similarly, codec 345 may convert digital signals received from the vocoder 351 to a downstream digital voice signal directed to the SLIC 311. Data output 321 from the vocoder 351, now a stream of bits, may be packetized by a PAD 353 for transmission on a broadband media. A connector 390 or other interface may link the PAD 353 to a backplane 307 having interconnect to broadband media, including those supporting T1, ISDN, and OC3 among others known in the art. Each of said functional blocks, vocoder 351 and PAD 353 may be performed by a DSP or a CPU operating alone or together.

A reverse process may occur wherein the PAD 353 receives downstream voice packets addressed to it from the backplane 307 and assembles the downstream voice packets into a data stream for a vocoder 351. Vocoder may convert the data stream to a format amenable to digital to analog conversion. Codec 345 may perform the digital to analog conversion and provide the analog voice frequency signals to an input of the SLIC 311.

Although the invention has been described in the context of particular embodiments, various alternative embodiments are possible. Thus, while the invention has been particularly shown and described with respect to specific embodiments thereof, it will be understood by those skilled in the art that changes in form and configuration may be made therein without departing from the scope and spirit of the invention.

What is claimed is:

1. A plain old telephone service (POTS) extender for providing packets to a packet network and receiving packets from the packet network, the POTS extender comprising:
   a subscriber line interface circuit (SLIC) configured to detect a fallback signal received over at least one conductor and to transmit a Digital Subscriber Line (DSL) modem control signal responsive to the fallback signal;
   a DSL modem connected to the at least one conductor, the DSL modem configured to receive the DSL modem control signal and enter a quiescent state based on the DSL modem control signal; and
   a digital backplane interface connected to the SLIC for providing coded voice signals to the packet network when the DSL modem is in the quiescent state.

2. The POTS extender of claim 1, wherein the fallback signal is a current drain detected on the at least one conductor.

3. The POTS extender of claim 1, wherein:
   the SLIC is further configured to transmit a suppression signal to the DSL modem in response to the detected fallback signal; and
   the DSL modem is further configured to enter the quiescent state in response to the suppression signal.

4. The POTS extender of claim 1, wherein the POTS extender is further configured to transmit and receive coded voice signals while the DSL modem is in the quiescent state.

5. A method for use in a plain old telephone service (POTS) extender, the method comprising:
   detecting a fallback signal received over at least one conductor;
   entering a Digital Subscriber Line (DSL) modem into a quiescent state based on the detected fallback signal; and
   providing coded voice signals to a packet network when the DSL modem is in the quiescent state.

6. The method of claim 5, wherein the fallback signal is a current drain detected on the at least one conductor.

7. The method of claim 5, further comprising:
   transmitting a suppression signal to the DSL modem in response to the detected fallback signal, wherein the entering a DSL modem into the quiescent state is in response to the suppression signal.

8. The method of claim 5, further comprising:
   transmitting and receiving coded voice signals while the DSL modem is in the quiescent state.

\* \* \* \* \*